March 14, 1967    S. W. HERMAN    3,308,683
ADJUSTABLE SEAL
Filed March 4, 1965

INVENTOR.
Stanley W. Herman
BY
a. m. Heiter
ATTORNEY

United States Patent Office 3,308,683
Patented Mar. 14, 1967

3,308,683
ADJUSTABLE SEAL
Stanley W. Herman, Indianapolis, Ind., assignor to General Motors Corporation, Detroit, Mich., a corporation of Delaware
Filed Mar. 4, 1965, Ser. No. 437,241
11 Claims. (Cl. 74—607)

This invention relates generally to adjustable seals and more particularly to an improved sealing assembly having an adjustable sealing access sleeve for a power transmission drive line.

It is advantageous in many vehicle power trains to provide a connection between the transmission and the final drive assembly which may be easily disconnected so that the transmission and engine or the transmission alone may be removed as a unit from the vehicle for repair or replacement without substantial disturbance of the final drive assembly. This is particularly important with working class vehicles where it is desired to minimize time lost while undergoing such replacement or repair.

To provide for easy removal and replacement of such power transmission components, it is desirable that the drive connection between the transmission and final drive be sealed in such a manner to provide access to the connection when desired and yet provide reliable sealing to prevent escape of lubricants from and entry of foreign matter into the final drive assembly.

According to this invention there is provided an elongated tubular sealing sleeve adjustably mounted within a bore in a final drive housing and axially extendable into an open end of a transmission housing to provide a sealed passage connecting these housings which accommodates the drive connection between the transmission and final drive. Suitable sealing rings are provided between the sleeve and the final drive and transmission housings to provide fluid-tight sealing. In the assembled position the sleeve extends into the transmission housing which is in turn supported on a semi-cylindrical saddle portion of the final drive. A semi-cylindrical cap is removably secured to the saddle portion to secure the transmission housing to the final drive housing, to retain the sleeve in its extended position and to protect the sealing sleeve. Access is provided to the drive connection between the final drive and transmission by axially moving the sealing sleeve into the final drive assembly housing subsequent to removal of the cap.

It is an object of this invention to provide a new and improved sealing assembly featuring an adjustable sealing access sleeve.

Another object of this invention is to provide a new and improved fluid seal, joining adjacent housing components for preventing entry of foreign material into the components and escape of fluid therefrom.

Another object of this invention is to provide an adjustable lubricant seal between the transmission and final drive of a vehicle which can be easily displaced to facilitate the disassembly of the transmission from the final drive.

Another object of this invention is to provide a telescoping sleeve-type seal which provides fluid sealing between coupled transmission housing components and which provides ready access to a transmission drive line coupling between the components.

Another object of this invention is to provide a tubular sleeve which is adjustably mounted for longitudinal movement in the input bore of a final drive housing, which is received in a corresponding recess in a transmission housing to provide a protective fluid-tight seal when installed, and which may be subsequently adjusted or telescoped into the final drive housing to permit access to the connection between the final drive and the transmission output.

Another object of this invention is to provide a tubular sleeve seal adjustably mounted in a bore in a housing member and extendable into a bore in an adjacent housing member to provide a fluid-tight seal and further having means limiting longitudinal and rotational movement of the seal with respect to the housing members and adapted to be adjusted into one of the housing members to provide access to the previously sealed space between the housing members.

Further objects and advantages of this invention will be apparent from the following detailed description and by the accompanying drawings which illustrate an embodiment of this invention, in which.

Figure 1:
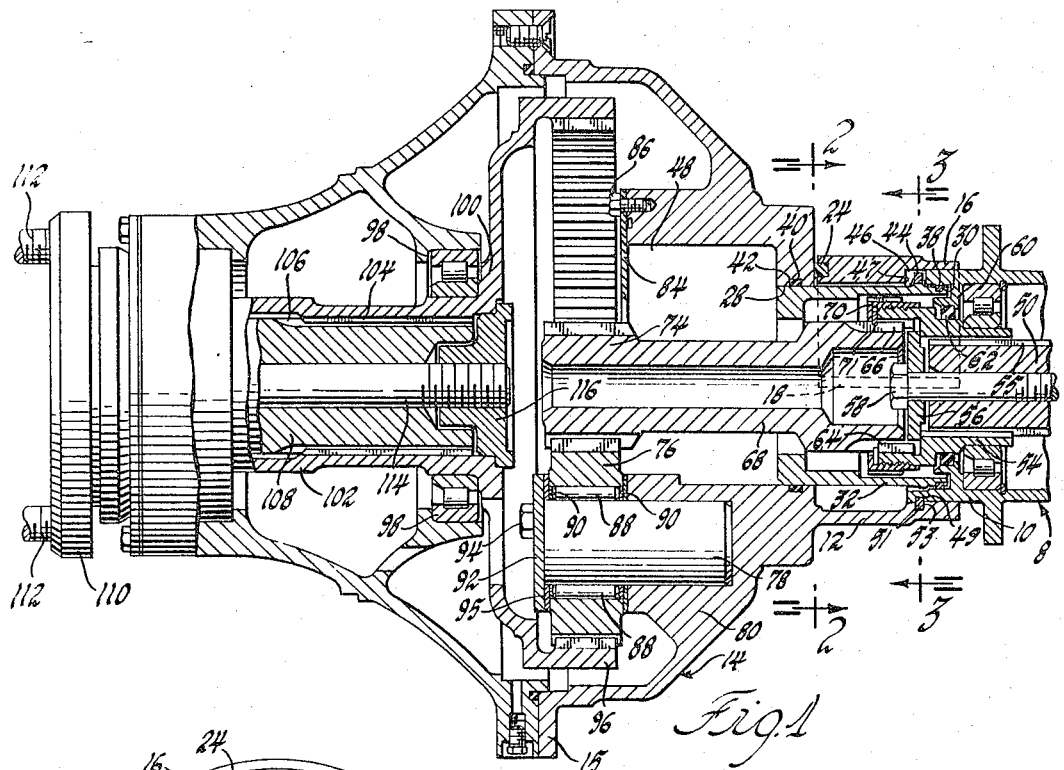
FIGURE 1 is a vertical, longitudinal cross-section of a final drive and transmission assembly built in accordance with the invention herein.

Referring to FIGURE 1, there is partially shown at 8 one output side of a cross-drive transmission including an end portion 10 of the transmission case. This end portion extends into a projecting semi-cylindrical transmission support saddle 12 of a final drive assembly 14 which is, in turn, supported through its housing 15 in a vehicle by a suitable fastening means, not shown. A semi-cylindrical cap member 16 is utilized to cover the saddle and the end portion 10 to hold the transmission in the saddle and to prevent entry of foreign matter into the final drive and transmission assemblies.

Figure 2:
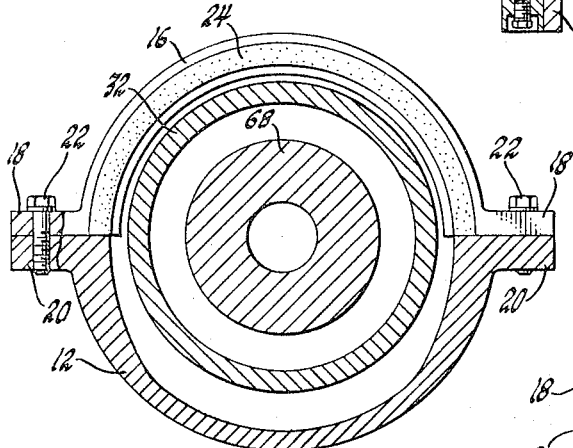
FIGURE 2 is a transverse cross-section taken along lines 2—2 of FIGURE 1.
Figure 3:
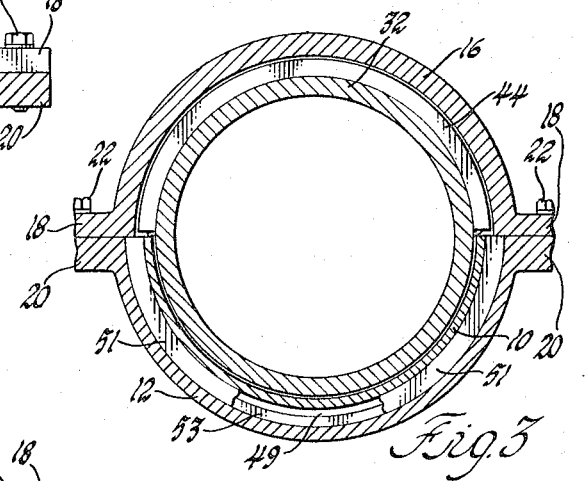
FIGURE 3 is a transverse cross-section taken along lines 3—3 of FIGURE 1.
Figure 4:
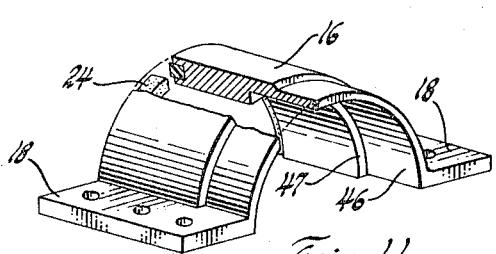
FIGURE 4 is a perspective view of a cap member used with the preferred embodiment of the invention.

As best shown by FIGURES 2 and 3, the cap and saddle are formed, respectively, with corresponding flanges 18 and 20 which are provided with openings for the reception of connecting bolts 22 which thread into the flanges 20, as shown in FIGURE 2. The abutting faces of flanges 18 and 20 and the semi-circular seal 24 secured to one end of cap member 16, which abuts against the inner end of the final drive housing, prevents entry of dust and other foreign matter into the final drive housing and to the coupling between the final drive assembly and the transmission output. The final drive assembly 14 is formed with a circular entry bore 28 which is aligned with a circular bore or recess 30 formed in the end portion 10 of the transmission case, as best shown in FIGURE 1. A cylindrical sleeve 32, preferably of steel construction, closely fits in bore 28 and extends from the final drive assembly into the recess 30 in the end of the transmission case. The outer end portion of this sleeve is formed with a circular groove in which a resilient sealing ring 38 is positioned. When the sleeve 32 is inserted in this recess, the resilient ring 38 will be compressed by the inner walls defining recess 30 to provide adequate sealing between the sleeve and the transmission case. The other end of the sleeve compresses a similar resilient ring 40 which is mounted in an annular groove 42 provided in the final drive housing walls which define circular bore 28. It will be appreciated that with this sleeve in its sealing position, shown in FIGURE 1, there can be no escape of lubricants contained in housing 15 or the transmission through the sealing assembly of the sleeve and cooperating sealing rings. The sleeve 32 has an upstanding semi-circular lug portion 44 secured thereto which is received within an internal relieved portion 46 of the cap 16. This lug portion will, when contacting the vertical face 47 of the relief portion of the cap, prevent the inward, telescoping, longitudinal movement of the sleeve into the chamber 48 of the final drive assembly and through its opposed ends prevent rotation of the sleeve by contact with flanges 20.

As shown in FIGURES 1 and 3, the end portion 10 of the transmission case has an external peripheral groove 49 near the end thereof in which a semi-circular metallic ring 51 is positioned. This ring is adapted to engage in an inner peripheral semi-circular groove 53 formed in the end of the saddle 12 to locate the transmission and the final drive assembly and to prevent relative longitudinal movement therebetween when coupled. The end portion 10 of the transmission case is hollow and houses a transmission output shaft 50 provided with a coupling member 54. This member is secured to the output shaft 50 by internal splines which mesh with external splines 55 on the end of output shaft 50 to prevent relative rotational movement therebetween and is retained from longitudinal movement thereon by a retainer and sealing plate 56 and a bolt 58. This bolt extends through the plate and threads into the end of the output shaft 50.

A suitable annular anti-friction bearing 60 rotatably supports the coupling member and the end of the output shaft 50 in the end portion 10 of the transmission case. Also, an annular fluid seal 62, located between the outer periphery of the coupling member and the interior of the end portion of the transmission case, is provided to seal the transmission from the final drive assembly. The coupling member 54 is formed with a hollow head portion having internal splines 64 which are adapted to mesh with external splines 66 of an elongated final drive input shaft 68 that projects into the head portion. The other end of shaft 68 extends into the final drive planetary gear system described below. Further describing the coupling member 54, it will be seen that the exterior end thereof is threaded for the reception of a coupling nut 70. A C-shaped retainer 71, held securely between the inner face of this nut and the outer end of the head portion of the coupling member, is positioned in a peripheral groove transverse in the splines 66 of the input shaft 68. This retainer prevents the longitudinal movement of the final drive input shaft 68 when properly joined with transmission output shaft 50.

The input shaft 68 of the planetary gear set is elongated and has on the end opposite from the splined end, an integral sun gear 74. This sun gear meshes with planet gears 76 whose spindles 78 are pressed in an internal fixed support structure 80 of the final drive assembly which provides a stationary carrier for the planetary gears. As shown, a wear plate 84 is secured by suitable bolts 86 of the internal support portion 80 between the planet gears and the stationary carrier provided by the internal support structure. Roller bearings 88 rotatably support the planet gears on their spindles and are retained in operating position by annular spacers 90. The spindles and the gears mounted thereon are retained in position by retainer plate 92 which is fastened to the internal support structure or stationary carrier by bolts 94. Wear plates 95 are preferably installed between retainer plate 92 and gear 76, as indicated.

The planet gears mesh with output ring gear 96 which is rotatably mounted in the final drive assembly housing by annular anti-friction bearing 98. As shown, the ring gear 96 has a hub portion 100 which forms a seat for these bearings 98 and has an integral, hollow, longitudinally-extending shaft portion 102. This shaft portion has internal splines 104 which mesh with the external splines 106 of the final drive assembly output shaft 108. Shaft 108 extends through the shaft portion 102 and an end cap of the final drive assembly and terminates in an external cylindrical output 110 having projecting threaded studs 112.

In a conventional manner, these studs provide means to which a drive wheel may be connected. Also, as shown in FIGURE 1, the shaft 108 is retained in the final drive assembly by means of a central bolt 114 extending through the shaft portion 102 into a nut 116 which seats in a retaining recess provided in hub portion 100.

With the present invention, the assembly and disassembly of the final drive and the transmission is facilitated and improved sealing is provided to prevent escape of lubricants from the final drive assembly and entry of foreign matter into this assembly and transmission.

For removal of the transmission from the final drive, the bolts 22 are removed and cap 16 is taken off. Utilizing lug portion 44 as a handle, the sleeve 32 can be telescoped or longitudinally moved in its bearing, formed by the final drive bore 28, into the chamber 48 of the final drive assembly. The coupling nut 70 is then unscrewed and the C-shaped ring is taken out and the final drive input shaft 68 can be moved longitudinally to the left for disengagement of the spline connection between the shaft 68 and the transmission output shaft 50. The transmission 8 can then be lifted upwardly out of the saddle off of locator ring 51 and removed from its vehicular environment.

To replace this transmission by another, a reverse procedure is undertaken. Thus, the end portion of the replacement transmission can be vertically lowered into the saddle and positioned by the engagement of the locator ring 51. The shaft 68 can be moved longitudinally to the right to provide the spline connection between the shaft 68 and transmission coupling member 54. The C-shaped retainer member can be then installed to prevent further longitudinal movement of shaft 68 and the coupling nut can then be threaded onto the end of the coupling member. Sleeve 32 is then axially moved to the right in FIG. 1 to reengage the seal 38 in recess 30. Cap 16 is then installed in its position through threaded bolts 22 to hold the transmission in position. It should be noted that cap 16 cannot be properly fastened to the saddle until the sleeve is in its proper sealing position due to the fact that the upstanding lug 44 would contact the inner surface of the cap and prevent proper seating of the cap. The upstanding lug thus provides a feature which ensures that proper sealing has been accomplished.

Although applicant's sealing assembly has been described with particular reference to a cross-drive transmission and final drive, it could readily be employed with other power-transmitting units or in entirely different environments such as in pipe or tube couplings. It will be further understood that applicant's invention is not to be limited to that which is particularly shown and described but only to that which is defined in the appended claims.

I claim:

1. In a telescoping seal between spaced first and second relatively stationary members, comprising a sealing member mounted for axial reciprocal movement in said first member, said sealing member being extendable from a telescoped position in said first member into a position within said second member to connect said members in a fluid-tight manner, said sealing member being axially retractable from said position within said second member back into said first member to provide access to the space confined by the sealing member when extended.

2. In a telescoping seal between first and second relatively stationary members, comprising a sealing member slidably mounted in said first member and extendable into said second member, means between said first member and said sealing member and between said second member and said sealing member to effect a fluid-tight seal therebetween, said sealing member being axially retractable from said second member back into a telescoped position within said first member to provide access to the space previously sealed by the sealing member when extended into said second member, means for rigidly connecting said first and second members and for limiting the axial movement of said sealing member into said second member.

3. In a telescoping seal, a tubular sleeve, a support having a bore therein in which said sleeve is mounted for axial reciprocal movement, resilient sealing means between said sleeve and the walls defining said bore, said sealing means being compressed by said sleeve and said support to effect a fluid-tight seal between said sleeve and said support, a cap means secured to said support for covering said sleeve, and cooperating means on said sleeve and said cap member for limiting movement of said sleeve into a telescoped position within said support.

4. In a sealing assembly, comprising a tubular sealing member, supporting means having an opening in which said tubular member is slidably mounted, means between said tubular sealing member and the walls defining said opening to effect a fluid-tight seal therebetween, said tubular sealing member being adjustable between a telescoped position within said supporting means in which access is provided to the space to be sealed by said tubular sealing member and an extended position in which said tubular sealing member encompasses the space to be sealed, said sealing member having a major portion located within said support means in said telescoped position, and retaining means on said supporting means for holding said tubular sealing member in its extended position.

5. In a sealing assembly, comprising a tubular sealing member, supporting means having an opening in which said tubular member is slidably mounted, means between said tubular sealing member and the walls defining said opening to effect a fluid-tight seal therebetween, said tubular sealing member being adjustable between a telescoped position within said supporting means in which access is provided to the space to be sealed by said tubular sealing member and an extended position in which said tubular sealing member encompasses the space to be sealed, and retaining means on said supporting means for holding said tubular sealing member in its extended position, said supporting means including a projecting support saddle, said retaining means including a cap member removably secured to said saddle, said cap member and said saddle defining an opening accommodating said tubular sealing member when in an extended position.

6. The sealing assembly of claim 5 including a second supporting means having an opening in which an end of said tubular sealing member projects in its extended position, means between said tubular sealing member and the walls defining the last-mentioned opening to effect a fluid-tight seal therebetween, said second supporting means being coupled to said first supporting means by said support saddle and said cap member.

7. In a sealing assembly for sealing first and second members, a telescoping sleeve member mounted for axial movement in said first member and extendable into said second member to join said members in a fluid-tight manner, a saddle on one of said members for supporting the other of said members, a cap removably secured to said saddle, said cap and said saddle defining an opening receiving said sleeve member when in the extended position, projecting means on said sleeve member cooperating with said cap to limit the telescoping of said sleeve member into said first member, said sleeve being movable into said first member when said cap has been removed to provide access to the space sealed by said sleeve member when extended into said second member.

8. In a device of the character described, first and second spaced housings each having a bore therein, power transmitting shaft means located in said housings and extending through said bores, support means on one of said housings for supporting the other of said housings, telescoping tubular sleeve means closely fitting the bore of one of said housings and extendable into the bore of the other of said housing in a closely-fitting manner to tightly seal said first housing to said second housing, said sleeve means surrounding a portion of said shaft means, means removably secured to said support means for retaining said sleeve means in its extended sealing position and for securing said housings together, means connected to said sleeve to facilitate the telescoping of said sleeve means into one of said housings to break the seal between said sleeve means and the other of said housings and to provide access to said shaft means and the space between said housings.

9. In a device of the character described, a housing having a bore formed therein and a semi-cylindrical saddle portion projecting therefrom, a semi-cylindrical removable cap portion which cooperates with said saddle portion to provide an opening aligned with said bore, a drive shaft rotatably mounted in said housing and projecting through said bore and said opening, a second housing having a cylindrical extension mounted in said opening, a rotatable shaft mounted in said second housing, coupling means for connecting the end portions of said shafts, a metallic sleeve surrounding the coupled ends of said shafts, said sleeve being mounted in said bore of said first housing for axial movement therein, said second housing having an annular groove for reception of one end of said sleeve, said sleeve having an outwardly-extending projection, said cap having an internal shoulder for engaging said projection to limit axial movement of said sleeve into said first housing, resilient sealing means between said bore in said first housing and said sleeve to tightly seal said first housing and said sleeve, second resilient sealing means between said sleeve and said annular groove in said second housing to tightly seal said sleeve and said second housing, said projection on said sleeve further providing means to facilitate movement of said sleeve axially into said second housing to uncover said coupling between said shafts when said cap is removed.

10. In a sealing assembly, first and second housings, a sleeve member mounted for longitudinal movement in one of said housings and axially extendable into the other of said housings to join said housings in a fluid-tight manner, means on one of said housings for supporting the other of said housings, a cover member for said means removably connected to said means for securing said housings to each other and to retain said sleeve in an extended position, means on said cover member preventing installation of said cover member on said first means when said sleeve member is not in its extended position.

11. The assembly of claim 10 wherein said last-mentioned means is an upstanding projection integral with said sleeve member.

References Cited by the Examiner
UNITED STATES PATENTS

| | | | |
|---|---|---|---|
| 1,680,306 | 8/1928 | Stewart | 74—606 |
| 3,095,220 | 6/1963 | Johnston et al. | 285—363 |
| 3,241,867 | 3/1966 | Guarnaschelli | 285—109 |

FRED C. MATTERN, Jr., *Primary Examiner.*

W. S. RATLIFF, *Assistant Examiner.*